Feb. 2, 1971        H. A. BARKUS        3,560,033

TELESCOPIC POSITIVE LOCK STRUT

Filed Feb. 25, 1969        2 Sheets-Sheet 1

*INVENTOR.*
HOMER A. BARKUS

BY *Knox & Knox*

Feb. 2, 1971 H. A. BARKUS 3,560,033
TELESCOPIC POSITIVE LOCK STRUT
Filed Feb. 25, 1969 2 Sheets-Sheet 2

INVENTOR.
HOMER A. BARKUS
BY Knox & Knox

United States Patent Office 3,560,033
Patented Feb. 2, 1971

3,560,033
TELESCOPIC POSITIVE LOCK STRUT
Homer A. Barkus, 2621 University Ave.,
San Diego, Calif. 92104
Filed Feb. 25, 1969, Ser. No. 802,169
Int. Cl. F16b 7/10
U.S. Cl. 287—58                             3 Claims

ABSTRACT OF THE DISCLOSURE

The strut is adaptable to chairs, tables, stands for microphones, lamps and the like, and many other uses for which telescopic struts are required. A fully enclosed wedge and ball type mechanism provides positive locking at any of a large number of different positions, and means is included to retain the strut at any selected locked position. A simple release mechanism permits rapid adjustment and, if the locking mechanism is not properly engaged, application of load on the strut will complete the locking action without danger of slippage.

BACKGROUND OF THE INVENTION

The present invention relates to structural members and specifically to a telescopic positive lock strut.

Many telescopic struts used for chairs or stools, microphone stands and the like use a wedge type clamp which jams ball elements outwardly against the wall of a tubular strut. For light loads this is adequate, but heavy loads can cause slippage, particularly if the mechanism is not securely locked when a load is applied.

SUMMARY OF THE INVENTION

The strut described herein uses a wedge member driving ball elements into clamping engagement with a sleeve, which is provided with deep annular channels into which the ball elements seat for substantially half their diameter. The channels are separated by sharply peaked ribs of insufficient area to allow the ball elements to bind under load. If the ball elements should inadvertently be wedged against a rib, a slightly axial load will cause them to drop the short distance into the adjacent channel and lock the strut. There is no tendency for the ball elements to slip or bounce further than the immediately adjacent channel. Adjustment is very simple and means is provided to retain the strut at any selected locked position.

DESCRIPTION OF THE PREFERRED EMBODIMENT

Figure 1:
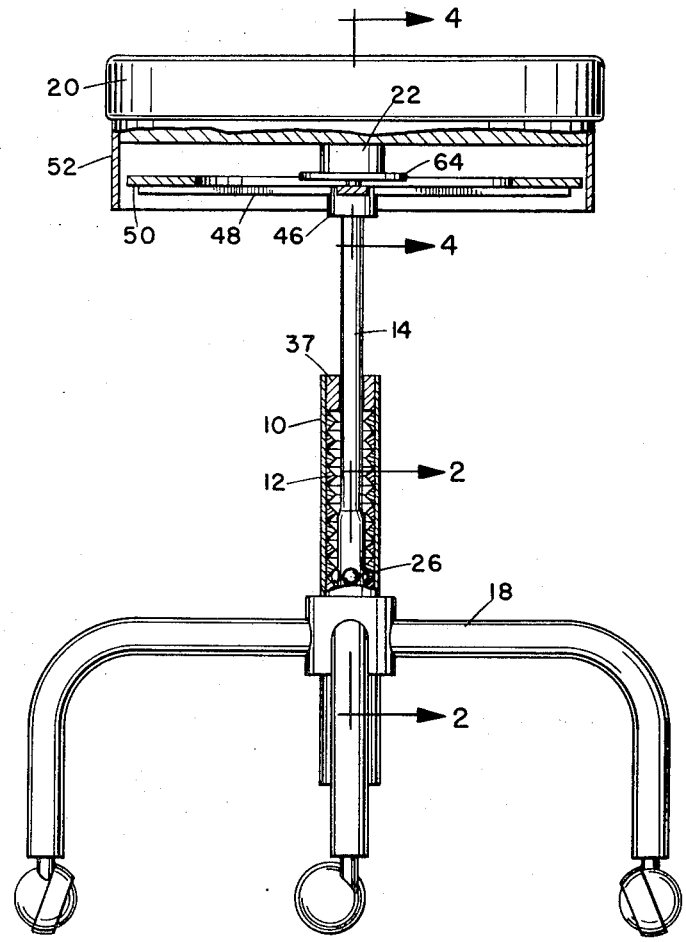
FIG. 1 is a side elevation view, partially cut away, of a stool incorporating the strut.

For purposes of description the strut is shown as being used as the supporting post of a stool, but it should be understood that the strut is by no means limited to such a use.

The strut comprises a cylindrical outer barrel 10 in which is fixed a locking sleeve 12, and slidable in the locking sleeve is a tubular post 14, with a locking rod 16 axially slidable in the post. In the application to a stool, as shown, the barrel 10 is secured to a leg assembly 18 of any suitable type and a seat 20 is mounted on a boss 22 on the upper end of locking rod 16. The lower end portion of post 14 comprises a cage 24 containing a plurality of ball elements 26 which are movable radially through openings 28 in the cage. Locking rod 16 has a conical wedge portion 30 at the lower end thereof, tapering to an integral retaining pin 32 which projects through the closed lower end 34 of the post 14. The diameter of retaining pin 32 is such that the ball elements 26 can retract substantially flush with the outer surface of post 14, but cannot fall into the interior of the cage 24. Upward motion of locking rod 16 is limited by a stop 36 through the protruding end of retaining pin 32. Cage 24 is slightly larger in diameter than the remainder of post 14 and acts as a stop to prevent the post from being pulled completely out through the bearing plug 37 at the top of barrel 10. This also ensures that a sufficient length of the post remains in the barrel for stability.

The inner surface of locking sleeve 12 has a plurality of axially spaced annular channels 38, separated by sharply peaked ribs 40. Each channel 38 is substantially V-shaped in cross section and is large enough to receive ball elements 26 for approximately half their diameter. Ribs 40 need not be actually knife edged, but are narrow as is practical to prevent the ball elements 26 from seating against the ribs, as hereinafter described. To avoid binding against the ribs 40, the lower end of cage 24 is inwardly tapered, as indicated at 41.

Figure 2:
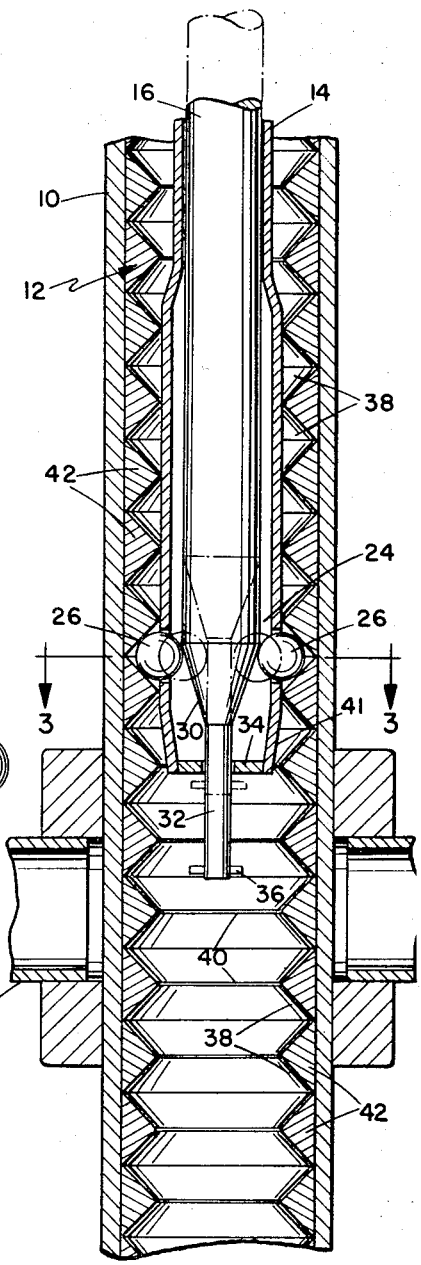
FIG. 2 is an enlarged sectional view taken on line 2—2 of FIG. 1.
Figure 3:
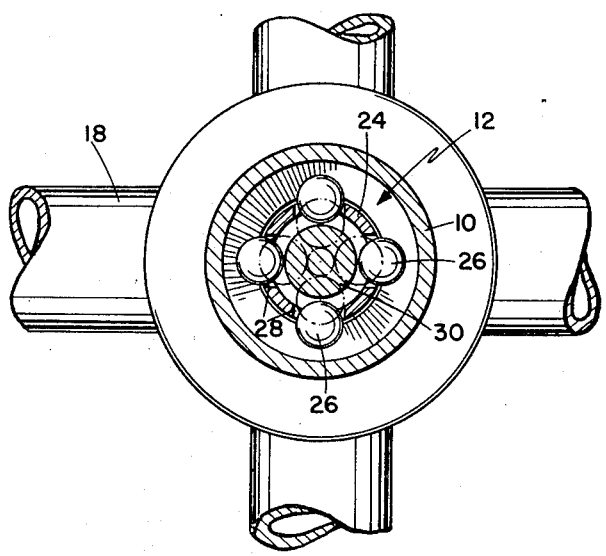
FIG. 3 is a sectional view taken on line 3—3 of FIG. 2.
Figure 6:
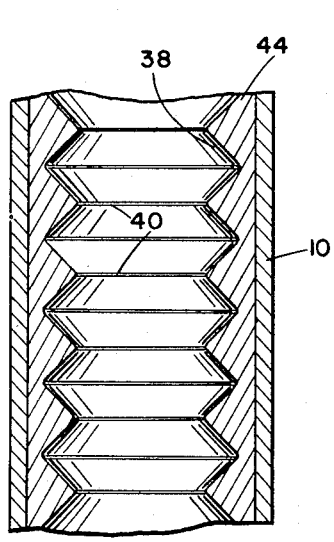
FIG. 6 is a sectional view similar to a portion of FIG. 2, showing an alternative locking sleeve structure.
Figure 5:
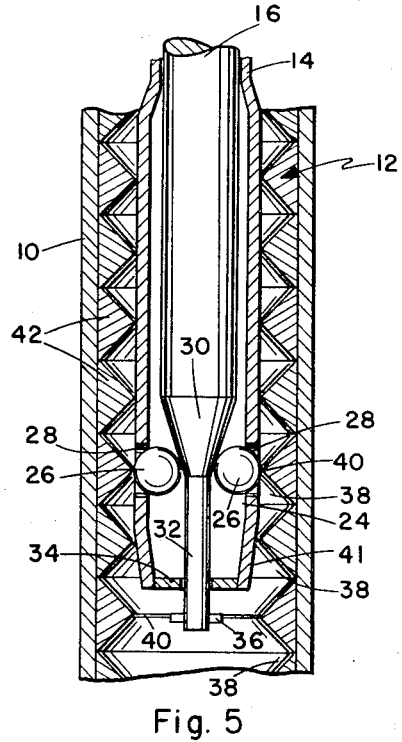
FIG. 5 is a sectional view similar to a portion of FIG. 2, showing the mechanism in unlocked position.

In FIGS. 2 and 5 the locking sleeve 12 is shown as being composed of a stack of ring elements 42 with opposed conical inner faces to form the channels. Alternatively, a unitary locking sleeve 44 may be used, as in FIG. 6, with the channels and ribs machined or otherwise formed therein.

The strut is adjusted by lifting the locking rod 16 in the post 14, allowing the ball elements 26 to retract, as in the broken line position in FIG. 2, so that the post can be moved telescopically to the required position. When locking rod 16 is lowered or pushed into the post, wedge portion 30 forces the ball elements 26 outwardly to lock into the adjacent channel 38, as in the full line position in FIG. 2. If the post should be positioned so that the ball elements are forced outwardly against a rib 40, as in FIG. 5, the weight of the post or the load on the locking rod will cause the assembly to drop slightly until the ball elements seat properly in a channel 38. It is this combination of deep channels and narrow separating ribs that provides the strut with its positive locking capability. When the locking action is applied, the strut can slip, at the most, about half the width of one channel before locking securely. There is no tendency for the ball elements to bounce over several channels and no possibility of slippage under load. The load is carried primarily by the locking sleeve and the outer barrel need not be excessively heavy.

Figure 4:
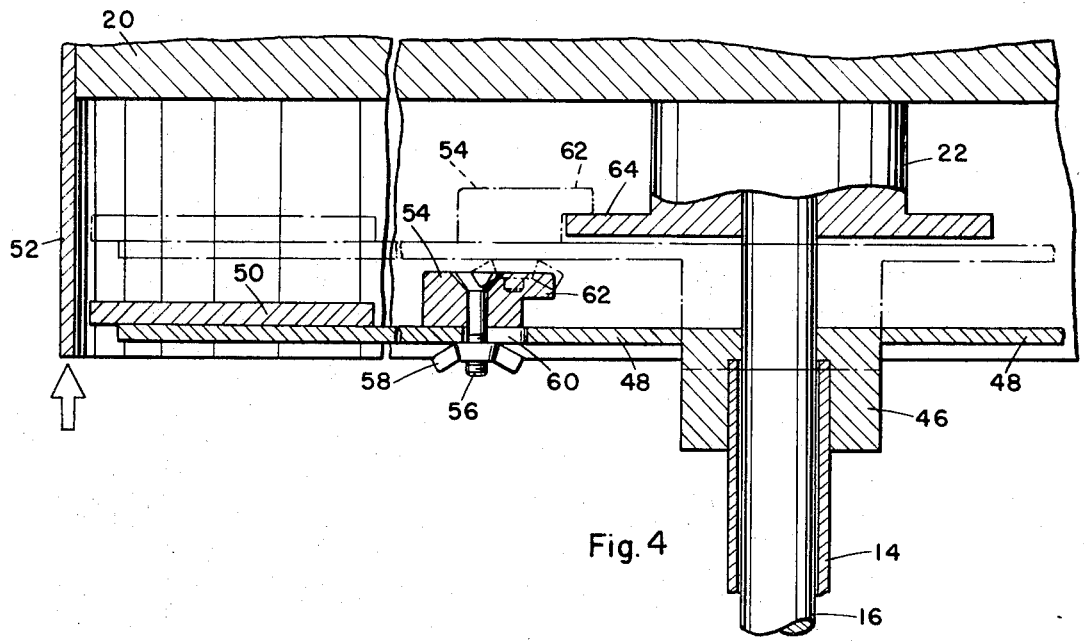
FIG. 4 is an enlarged sectional view taken on line 4—4 of FIG. 1, but with the strut in unlocked position.

In the stool configuration the height is adjusted simply by lifting the seat to raise the locking rod 16, as in the full line position in FIG. 4, then sliding the post to the required position and releasing the seat. The weight of the seat will complete the locking action. To facilitate picking up the stool without changing the height setting, a collar 46 is secured to the upper end of post 14, the collar having extended arms 48 which support a lifting ring 50 under the seat. In the structure shown the seat has a downwardly extending annular wall 52 which conceals the lifting ring. When the stool is picked up with the fingers under the edge of wall 52 and holding lifting ring 50, the weight is taken on post 14 with no motion of the locking rod 16.

The strut is easily locked at any selected position against inadvertent adjustment by any suitable retaining means holding post 14 and locking rod 16 from relative motion. In the stool this is accomplished by a clamp member 54 held on one arm 48 by a bolt 56 and wing nut 58, the bolt extending through a radially elongated slot 60 in the arm. On the inner end of clamp member 54 is a protruding tongue 62 which engages a flange 64 on boss 22 when the clamp member is shifted inwardly, as in the broken line position in FIG. 4. For other uses of the strut, alternative mechanisms are easily devised.

While the telescopic components of the strut are indicated as being circular in cross section, it should be understood that non-circular members may be used, particularly if the strut is to be non-rotating.

I claim:
1. A telescopic strut, comprising:
   an elongated outer barrel;
   a locking sleeve in said barrel, having a plurality of axially spaced annular V-shaped channels separated by sharply peaked narrow ribs;
   a post axially slidable in said locking sleeve, said post having a cage portion with openings therein;
   a plurality of ball elements retained in said cage portion at said openings;
   a locking rod axially slidable in said post and having a wedge portion engaging said ball elements, to force the ball elements outwardly through said openings into one of said channels, said post is a tube slidably supporting said rod and said cage is an enlarged diameter end portion of said tube.

2. The structure of claim 1, wherein said barrel has a plug through which said post is a close sliding fit, said cage portion being of larger cross section than the remainder of said post and comprising a stop to limit extension of the post.

3. The structure of claim 1 and in addition including clamp means releasably connecting said post and locking rod against relative motion.

References Cited

UNITED STATES PATENTS

| | | | |
|---|---|---|---|
| 631,765 | 8/1899 | Burk | 287—58CT |
| 737,570 | 9/1903 | Bowen | 85—5BUX |
| 1,194,551 | 8/1916 | Schossler | 248—412 |
| 2,388,056 | 10/1945 | Hendricks | 248—407 |
| 2,658,777 | 11/1953 | Douglas | 287—58CT |
| 3,058,715 | 10/1962 | Porkka | 287—58CT |

FOREIGN PATENTS

| | | | |
|---|---|---|---|
| 560,491 | 7/1923 | France | 287—58CT |
| 68,604 | 1/1958 | France | 248—412 |

DAVID J. WILLIAMOWSKY, Primary Examiner

A. V. KUNDRAT, Assistant Examiner

U.S. Cl. X.R.

248—412